United States Patent [19]

Gergely

[11] 4,065,239

[45] Dec. 27, 1977

[54] JAM PREVENTION DEVICE FOR EXTRUSION PROCESS

[75] Inventor: Alex Sandor Gergely, Bon Air, Va.

[73] Assignee: Philip Morris, Inc., Richmond, Va.

[21] Appl. No.: 766,965

[22] Filed: Feb. 9, 1977

Related U.S. Application Data

[63] Continuation of Ser. No. 623,497, Oct. 17, 1975, abandoned.

[51] Int. Cl.$^2$ ............................................. B29F 3/00
[52] U.S. Cl. ................................... 425/141; 425/142; 83/607
[58] Field of Search ............... 425/140, 141, 142, 297, 425/305.1, 309, 315; 83/607, 608, 609, 580, 926 H

[56] References Cited

U.S. PATENT DOCUMENTS

| | | | |
|---|---|---|---|
| 328,228 | 10/1885 | Kerstetler | 83/607 X |
| 2,179,897 | 11/1939 | Oelkers | 83/607 X |
| 3,537,623 | 5/1971 | Thomson et al. | 264/135 |
| 3,538,210 | 11/1970 | Gatto | 264/90 |
| 3,813,200 | 5/1974 | Gergely | 425/140 |
| 3,852,144 | 12/1974 | Parry | 83/926 H |

Primary Examiner—Richard B. Lazarus
Attorney, Agent, or Firm—Cameron, Kerkam, Sutton, Stowell & Stowell

[57] ABSTRACT

There is disclosed a device for preventing a jam of the entrance sizing aperture into a cooling chamber aligned to receive the extrudate derived from an extrusion process apparatus. More specifically, the jam preventing device includes a circular shaped cutter blade pivotally mounted at a point offset from its center and upon detection of an outsized extrudate, driven to sever the extrudate entering the cooling chamber from that already directed therein, to prevent the outsized extrudate from being drawn into the sizing aperture or being driven therein by extruder pressure. The cutter blade is rotatably driven to achieve an extremely rapid cut of the extrudate and includes a cutter support disc whereby the cutter blade may be secured thereto in at least two positions so that a new cutting edge may be presented to the extrudate. Further, the rotating motion of the cutter blade effects a self sharpening action of its cutting edge.

5 Claims, 8 Drawing Figures

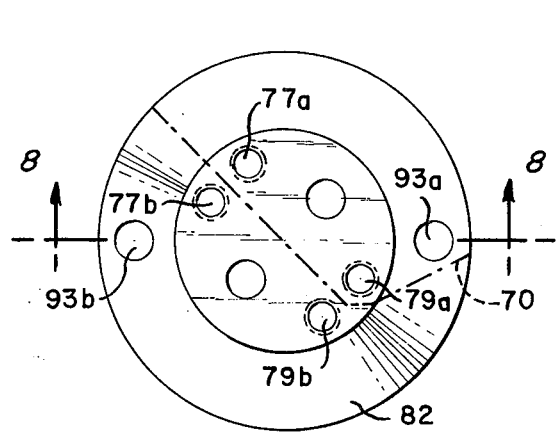
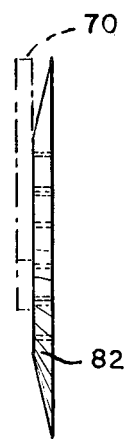
Fig. 6              Fig. 7
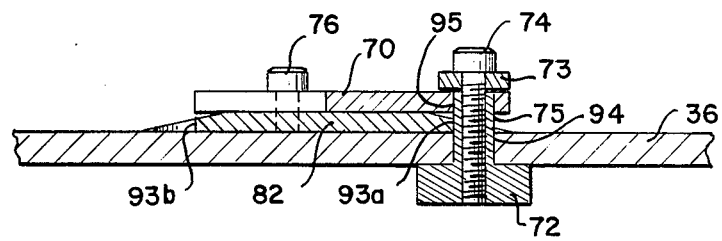
Fig. 8

JAM PREVENTION DEVICE FOR EXTRUSION PROCESS

This is a continuation, of application Ser. No. 623,497, filed Oct. 17, 1975 now abandoned.

BACKGROUND OF THE INVENTION

1. Field of the Invention

This invention relates to extrusion process apparatus and more particular to an improved device to sever or to cut an outsided extrudate feeding into a liquid filled cooling chamber for cooling the molten extrudate.

2. Description of the Prior Art

It is known to form certain types of continuous stock workpieces, such as rod and tubular shaped articles, from thermoplastic material by extruding the same as a heated extrudate from an extruder followed by passage of the heated extrudate through a cooling bath to remove heat therefrom so as to set or rigidize the material of the continuous stock which thereafter may be sectioned into individual articles for a particular intended end use. The extrudate further may be shaped and sized by passing the same through a closing or sizing aperture located advantageously at the entrance to the cooling bath. U.S. Pat. Nos. 3,538,210 and 3,579,623 both describe methods with which tubular articles can be made, such articles being characterized by having circumferential dimension of precise nature within a particular range of values. As is well-known in the extrusion art, and as is exemplified by the aforementioned patents, the extrudate if it is in tubular form generally will be issued from the extruder at a size somewhat larger than the final finished product and then directed through the sizing aperture to draw down the extrudate to the requisite final dimension. The extrudate will have, for formation of a workpiece of given size and with respect to the extrudate line speed and placement of extruder in relation to the cooling bath entrance, a predetermined dimension during its travel from the extruder to the sizing aperture, such predetermined dimension diminishing uniformally as the extrudate approaches the closing aperture.

If for any reason the extrudate should leave the extruding means at an outsized dimension, that is at a dimension greater than intended either by way of overall workpiece diameter at any given location, or by reason of foreign material in the extrudate, degradation of the extrudate or other factors which might cause the extrudate to have a greater thickness of the tube wall then intended, it is possible for the outsized extrudate upon entry through the closing aperture to jam the same. This can result in shutdown of the forming line apparatus as well as requiring that the aperture be freed, a not easy task because the plastic state extrudate when solidified in the aperture is difficult and time consuming to remove. Furthermore, if the extrudate were outsized to a point that it would cause a jam in the sizing aperture and a breakage in the extrudate occurred without fully jamming the sizing aperture, it is probable that cooling liquid from the bath thereof would escape through the aperture and splash onto adjacent machinery including the extruding apparatus to the detriment of the latter.

In a related U.S. Pat. No. 3,813,200, assigned to the assignee of this invention, there is disclosed a jam prevention device operative with an extrusion process apparatus, of which the present invention is an improvement. More specifically, there is disclosed in U.S. Pat. No. 3,813,200 a device responsive to the detection of an outsided extrudate for severing the extrudate feeding through an entrance sizing aperture and into a liquid filled cooling chamber and including a cutter blade mounted to move in a rectalinear motion from a first position to a second position, whereby a cutting edge of the cutter blade moves past the entrance sizing aperture to thereby cut or sever the extrudate at that aperture. Further, a photoelectric cell detection unit is provided in close proximity to the entrance sizing aperture. If the extrudate is outsized with respect to a desired predetermined dimension, the outsided extrudate interrupts the light beam to cause the cutter blade to move from its first to its second position. In the noted patent, the cutter blade has but a single cutting edge that acts in a manner of a "guillotine" to sever the extrudate. It has been found out in the use of such a device that the guillotine type of cutting action is relatively slow so that an undesired amount of outsized extrudate may build up before the cutter blade is able to sever it. Further, the single cutting edge tends to become dull necessating the shutdown of the extrusion process apparatus to permit a new cutter blade to be inserted therein. Such frequent shutdowns are of course undesirable in that continued manufacture is interrupted.

SUMMARY OF THE INVENTION

Therefore, it is an object of the present invention to extend the effective cutting life of the cutter blade of the jam prevention device of this invention.

It is a further object of this invention to facilitate a very rapid cutting action, whereby the extrudate may be rapidly severed before an undue amount thereof is built up at the entrance sizing aperture of the cooling chamber.

In accordance with these and other objects of this invention, there is provided an improved jam prevention device to be used in conjunction with an extrusion process apparatus and including a substantially circular cutter blade mounted for rotative motion at a point offset from its center, whereby an extremely rapid cutting action is achieved to sever the extrudate at an entrance sizing aperture into a liquid filled cooling chamber. Further, there is inlcuded a driving apparatus operative upon detection of an outsized extrudate to dispose a linking rod from a first or a second position, the linking rod being coupled to the rotatively mounted cutter blade.

In a further aspect of this invention, the linking rod is coupled to a cutter support disc, which in turn is capable of being removably secured to the cutter blade in at least one of two positions, whereby an unused cutting edge of the circular cutting blade may be disposed into a cutting position so that an extended life of the cutter blade is achieved. Further, the rotative mounting of the cutting blade achieves a sharpening action of its cutting edge with each movement of the linking rod between its first and second positions.

BRIEF DESCRIPTION OF THE DRAWINGS

These and other objects and advantages of the present invention will become more apparent by referring to the following detailed description and accompanying drawings, in which:

FIG. 6 is a front elevation view of the cutter blade and its cutter support disc;

FIG. 7 is a side elevation view of the cutter blade as shown in FIG. 6; and

FIG. 8 is a side, partially sectional view of the assembly of the cutter blade, of its cutter support disc and of the wall section plate of the cooling chamber shown in FIG. 1.

DESCRIPTION OF THE PREFERRED EMBODIMENT

The present invention is related to apparatus with which a continuous workpiece of thermoplastic material is formed by an extrusion process, the continuous workpiece generally being extruded from an extruder at somewhat greater size than the final finished product and then being passed through a cooling chamber in which the heated extrudate is cooled, the extrudate upon entry to the cooling chamber being drawn down and sized to the intended final workpiece dimension. The apparatus of the invention is suitable for use in connection with the forming of solid as well as tubular workpieces.

Figure 1:
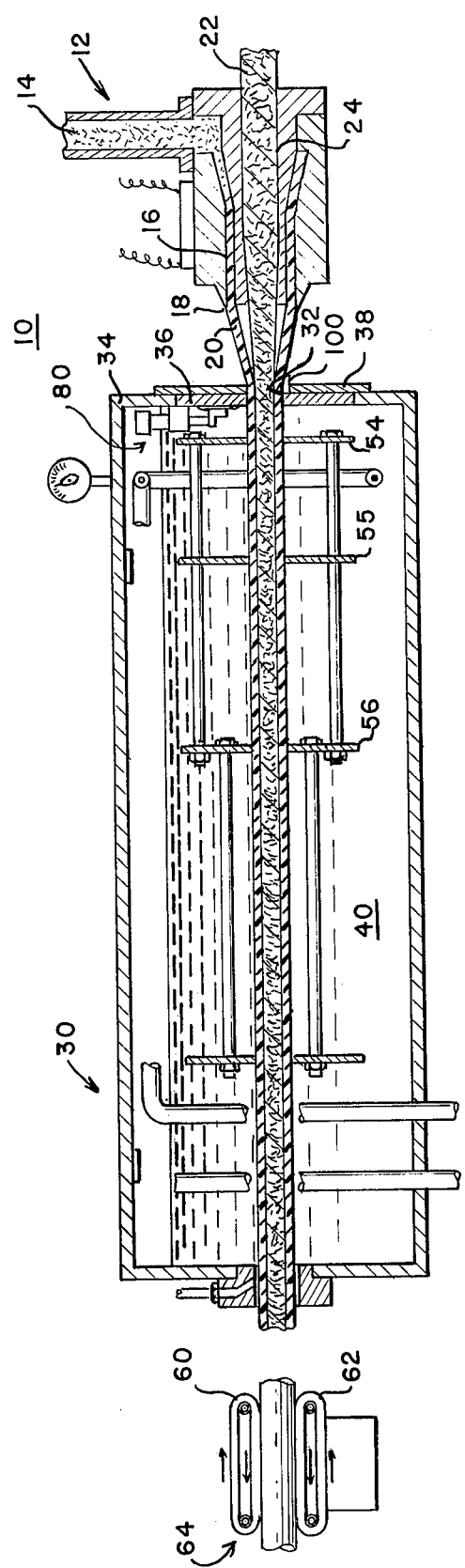
FIG. 1 is a sectional view of apparatus with which extruded plastic tubing may be made and sized, such apparatus being provided with a cutter blade and aperture sealing device to prevent jam up of the aperture in the event outsized extrudate issues from the extruder, such device being made in accordance with the present invention.

Referring now to FIG. 1 of the drawing, there is shown an apparatus generally similar to that disclosed and described in the aformentioned U.S. Pat. No. 3,813,200, such apparatus being modified in the extent as provided by the present invention. Briefly, the apparatus 10 includes an extruder 12 of conventional construction and from which molten thermoplastic material 14 is forced by screw extruder means (not shown) through a channel 16 formed therein and outwardly of an orifice 18 in the form of a tubular continuous extrudate or workpiece 20 of a size somewhat greater than the intended finished workpiece. Concurrently a tow of fibrous material 22 is advanced coaxially with the extrudate 20 and issues from a central passage 24 in the extruder 12 so that the finished workpiece will comprise a filled tubular article although it will be understood the following description is equally applicable to formation of an unfilled workpiece and as well to forming a solid workpiece. In the particular described instance, the article is intended for use in providing a stock from which cigarette filter components are sectioned.

The composite structure of the thermoplastic tube or extrudate 20 and of the fibrous material 22 enters a cooling chamber 30 through a sizing aperture 32 formed therein in one end wall 34 of the cooling chamber 30. More particularly, the orifice or aperture can be provided in a wall section plate 36 (FIGS. 3-5) which forms part of the wall structure and secured thereto by means of an annular holding ring 38, such wall plate 56 desirably is a gland disc of the type described in U.S. Pat. Nos. 3,538,210 and 3,579,623. In the cooling chamber 30 there is provided a bath 40 of a liquid coolant and optionally an assembly of additional sizing and support rings 54-56, there being shown only a few of the latter, reference being had to the aforementioned U.S. Patents for further and full description of the manner in which said sizing and support rings and bath of liquid coolant function to remove heat from the heated extrudate and accurately size the continuous workpiece. The composite structure of the continuous length filled extrudate 20 with its filler 22 is advanced through the cooling chamber 30 by means of an advancing unit 64 which comprises two endless belt members 60, 62 engaged with the cooled and sized extrudate downstream of the cooling chamber. As will be noted the level of liquid coolant 40 in the chamber 30 is located some distance above the aperture 32 formed in the end wall 34.

The present invention provides an apparatus with which jamming of the production apparatus, and particularly at the entrance sizing aperture 32 by an outsized extrudate is prevented in an improved manner. Thus, if the thermoplastic extrudate 20 were to issue from the extruder 12 at a size in excess of that which will draw down to achieve proper passage through aperture 32 in company with the filler 24, the manufacturing process is stopped and the oversized extrudate 20 severed from that already present in the cooling chamber 30. In this respect the extrudate 20 is issued from the extruder 12 at a predetermined dimension being drawn down in a tapered configuration from the exit of the extruder unit to the entrance of the cooling chamber aperture 32. It will be understood that such an extrudate 20 at any given location in the passage between these two locations will have an intended predetermined outer peripheral dimension. If such predetermined dimension varies from that desired by a certain value, it is intended that the cutter unit shown generally at 80 will function to sever the extrudate entering the cooling chamber 30 from that already present in the latter structure and also concurrently close off the aperture 32 to prevent outflow of liquid coolant in such manner as might cause damage to the extruder unit 12 and associated machinery and controls.

Figure 4:
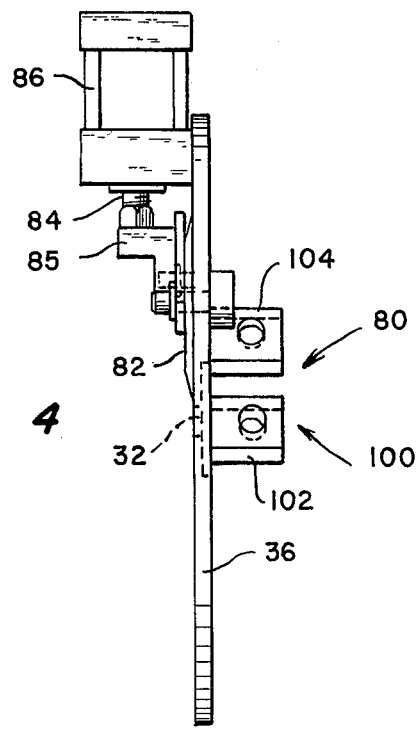
FIG. 4 is a side elevational view of FIG. 3.

Referring now to FIGS. 1 and 4, the cutter unit 80 works in cooperation with a detection unit 100 so that if the latter senses or detects an outsized dimension in the continuous tubular article issuing from the extruder 12, the unit 100 will cause operation of the cutter unit 80 to effect severance of the extrudate. The detection unit 100 is comprised of a photoelectric cell unit 102 disposed exteriorly of wall section plate 36 and functioning such that a light beam projected from beam projector 104 adjacent the travel course of the extrudate will be interrupted by an outsized extrudate component to thereby initiate closure of appropriate circuitry controlling the operation of the cutter unit 80. The cutter unit 80 which desirably is mounted interiorly of the wall section plate 36 includes a rotatably mounted, circularly shaped cutter blade 82 which is rotated upon sensing of the presence of an outsized extrudate 20 so that concurrently as the extrudate 20 is severed, the aperture 32 is closed.

Figure 3:
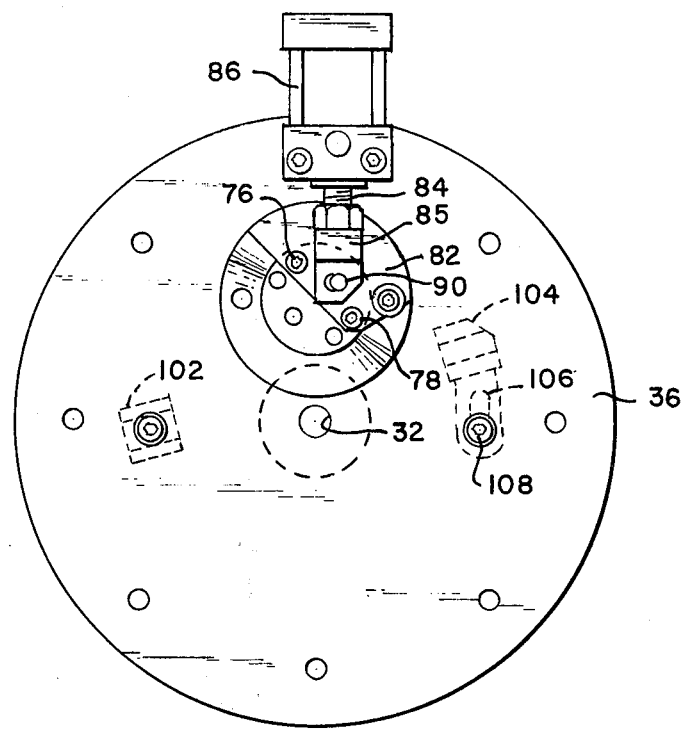
FIG. 3 is an end elevational view of an end wall section of the cooling chamber of the apparatus shown in FIG. 1 as viewed from the interior of the chamber and further showing the mounting of the rotatable, circular cutter blade of this invention.
Figure 5:
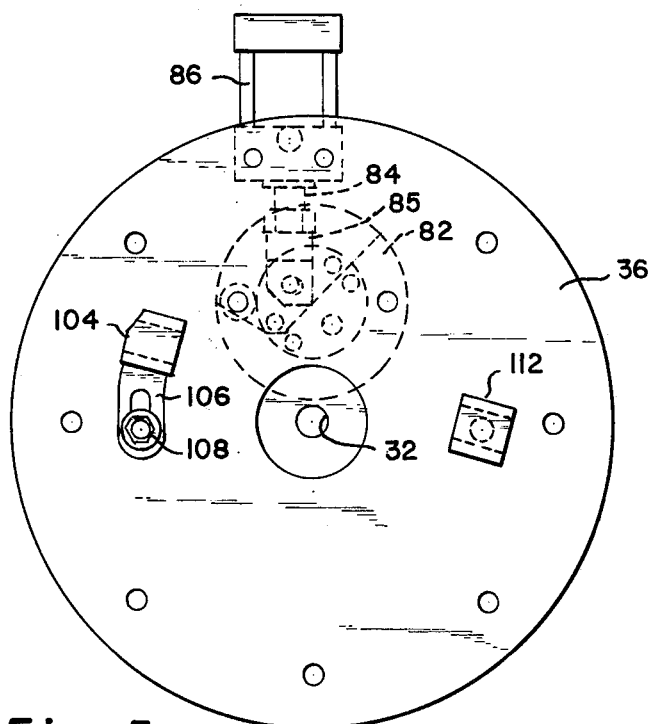
FIG. 5 is an end elevational view of the end wall section of the cooling chamber shown in FIGS. 3 and 4 except as viewed from the exterior thereof.

The constructional details of the circular cutter unit 80 and the associated apparatus for driving it with a rotating motion, are best seen with reference to FIGS. 3-8 of the drawings. In particular, the cutter unit 80 includes the circularly shaped cutter blade 82 mounted as shown in FIG. 4 on the interior of the wall section plate 36 of the cooling chamber 30 and is connected by means of a linking rod 84 and transfer block 85 to an air operated piston unit 86, the latter component being fixedly secured to the interior surface of the wall section plate 36. The sensing or detecting unit 100 which is located on the external side of wall section plate 36 as seen in FIGS. 3 and 5, includes a light beam projector unit 104 disposed on one side of the entrance sizing aperture 32 and works in cooperation with a photocell 102 to detect the presence of the outsided extrudate 20. More particularly, if the extrudate 20 is sized beyond a predetermined allowable limit, the light beam projected from the projector unit 104 to photocell 102 is interrupted and as will be explained in detail later, the interruption of the light beam effects the operation of the cutter unit 80. To accomodate altering the sensing or detecting unit 100, the light bean projector unit 104 is mounted adjustably on the end wall section plate 36, there being provided a slotted bracket 106 connected with the light beam projector unit 104 which can be selectively positioned with respect to the aperture 32 and the photocell 102, by loosening the nut 108 to reposition the light beam projector unit 104 in a desired location.

Referring now to FIG. 3, there is shown the manner in which the circular cutter blade 82 is pivotally mounted at a point offset from its center, upon the wall section plate 36. In particular, a mounting sleeve 72 is disposed through an opening 94 within the plate 36, an opening 93a within the cutter blade 82 and an opening 95 within a cutter support disc 70. In this manner the rectiliner motion of the lining rod 84 is "amplified" to effect a very rapid cutting motion by the cutter blade 82. Further, a screw 74 is inserted within the threadably received opening 75 of the sleeve 72, whereby a washer 73 secures the assembly of the cutter support disc 70 and the cutter blade 82 to the wall section plate 36.

As seen in FIGS. 6 and 7 the cutter support disc 70 and the cutter blade 82 are adapted to be connected together in an assembly, by a set of screws 76 and 78 (see FIGS. 3 and 8). As most clearly seen in FIG. 6, the cutter blade 82 is provided with a second set of complementary openings 77b and 79b, whereby the cutter blade 82 may be simply rotated to and secured in a second position. For example, the cutter blade 82 is secured to the support disc 70 in a first position as shown in FIG. 6, whereby its lower edge serves as a cutting edge until it becomes too dull to effectively sever the extrudate 20. At that time, the screws 76 and 78 may be readily removed, and the disc rotated approximately 180°, whereby the openings 77b and 79b are aligned with the corresponding openings of the cutter support disc 70 and the opening 93b is aligned with the opening 94 of the wall section plate 36. Once they are rotated, the sleeve 72 may be inserted through openings 94 and 93b to pivotally rotate the cutter blade 82, with a new cutting edge thereof disposed to cut the extrudate 20. Thus, the cutter blade 82 may be then positioned to this second position whereby a new cutting edge is operatively disposed to cut the extrudate 20. Further, it may be realized that the rotational movement as provided by the mounting assembly as shown in FIG. 8 permits a selfsharpening action of the cutting edge of the cutter blade 82 upon actuation of the power operated piston unit 86, as the cutter blade 82 moves across the surface of the wall section plate 36.

Figure 2:
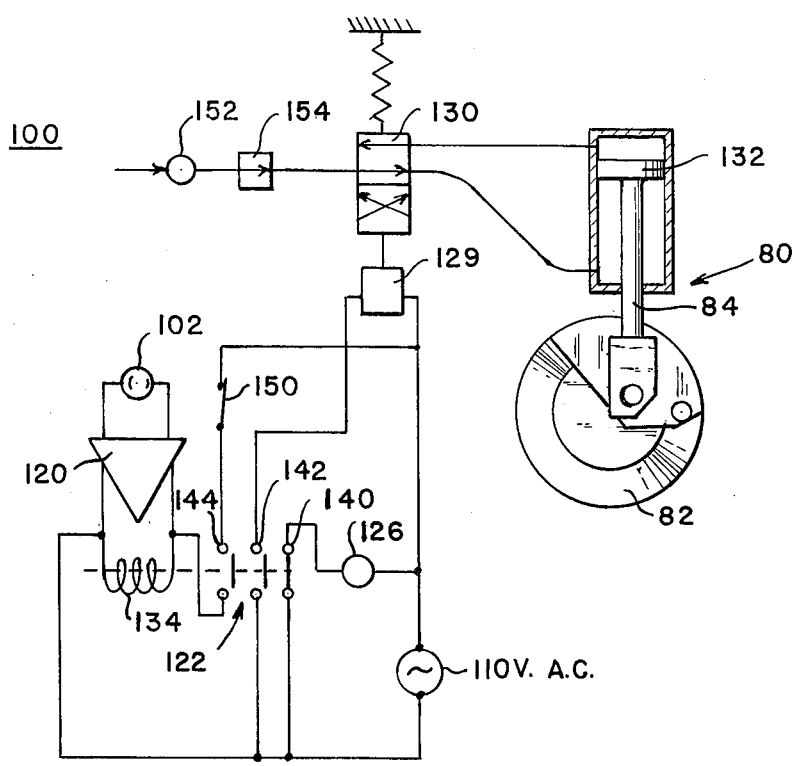
FIG. 2 is a circuit diagram depicting the means with which the photoelectric cell unit detects outsized extrudate and functions to operate the cutter blade unit to sever the extrudate and close the sizing aperture.

Referring now to FIG. 2 there is shown a schematic depiction of the circuitry associated with the apparatus of the present invention. The photoelectric cell 102 is in circuit with an amplifier 120 and a three contact set relay 122. The relay 122 controls the 110 volt a.c. circuit in which is provided a solenoid 124, extruder motor 126 which operates the extruder 12, and a latching circuit to hold the cutter blade 82 in a stationary position following its cutting movement to such position and after restoration of the detection unit 100, to normal sensing condition following removal of any outsized extrudate 20 which may have caused deactivation of the detection unit 100. With the apparatus in normal operation and the detection unit 100 activated to detect the presence of any outsized extrudate, the light beam from the light beam projector 104 will pass uninterrupted to the photo cell unit 102. Further, contact set 140 of relay 122 will be closed and the extruder motor 126 is activated to drive the extruder 12 to supply the extrudate 20. If an outsized extrudate 20 should issue from the extruder 12, the same will interrupt the light beam which condition will in turn be sensed by the photoelectric cell 102. When the light beam is interrupted, the amplifier 120 will operate to energize the coil 134 associated with the relay 122 to interrupt the circuit, pulling the contacts therein to positions in which contacts 142 close and the circuit to the solenoid 124 is closed. This actuation of the relay 122 energizes solenoid 124 to shift the positioning of an air control valve 130 to a position in which air will be admitted through filter 152 and regulator 154 above a piston 132 of the cutter unit 80 to drive the rod 84 downwardly moving it from its first to second operative positions, thereby rotating cutter blade 82 through a cutting motion. During the course of such travel the cutter blade 82 will sever any extrudate 20 entering the cooling chamber 30 from extrudate already present in much chamber and concurrently will when it reaches the extent of its rotation close aperture 32. Thereafter, advance means 60 will continue to operate to remove any such extrudate present in chamber 30. Relay unit 122 also includes a third set of contacts 144 which when the light beam is interrupted, closes to form a holding circuit to maintain the solenoid 124 energized and thereby maintain the cutter blade 82 in its extended position. Further, upon actuation of relay 122, its contacts 140 are opened thus de-energizing extruder motor 126 and preventing the further supply of the extrudate 20 to the cooling chamber 30. In circuit with the third set of contacts 144 is a normally closed switch 150 which is opened following restoration of the apparatus for normal operation, thus returning the cutter blade 82 from its extended position to its initial operative position.

Thus, there has been disclosed an improved jam prevention device, that employs a circular cutter blade that is rotatably mounted at a point offset from its center, whereby a more rapid cutting action is achieved to prevent the undue buildup of outsized extrudate. Further, use of such a circular cutter blade permits its movement to at least two positions whereby a new sharp edge is provided to cut the extrudate and providing an extended life of the cutter blade. Further, the circular motion would achieve a cleaner, more accurate cut and effects a selfsharpening of the cutter blade.

The invention has been described in detail with particular reference to preferred embodiments thereof, but it will be understood that variations and modification can be affected within the sphere and the scope of this invention. For example, the above invention has been described with regard to cutting a workpiece in the form of a cigarette filter; however, it is understood that this device may be also used to cut drinking straws or any plastic tubes or rods so formed.

I claim:

1. In an apparatus for forming a continuous thermoplastic workpiece including means for extruding a continuous workpiece of thermoplastic material as an extrudate of predetermined dimension, chamber means for receiving a liquid coolant therein, means for advancing the extrudate from said extruding means through a sizing aperture in said chamber means and through said chamber means, detection means for detecting any outsized variation dimension of the extrudate from a predetermined dimension beyond a certain allowable limit as the extrudate enters said sizing aperture, and means responsive to the detection by said sensing means of an outsized extrudate for moving rectilinearly a linking rod coupled thereto from a first to a second position, a cutter mechanism actuated upon movement of said linking rod from said first to said second position for severing the extrudate, wherein the improvement comprises:

a cutter blade having an extended, curved cutting edge and being coupled to said rectilinearly movable linking rod for actuation thereby; and said cutter blade being pivotally mounted to a fixed support at a point offset from its center to permit rapid rotation of said cutter blade across the path of the extrudate adjacent said aperture as said linking rod is moved rectilinearly from its first to its second position, thereby amplifying the effect of the rectilinear motion and effecting a rapid severing of the extrudate to prevent further extrudate from being drawn into said chamber means.

2. The apparatus as claimed in claim 1, wherein the fixed support is operatively coupled to said linking rod, and further including means for securing said cutter blade to said cutter blade support.

3. The apparatus as claimed in claim 2, wherein said securing means is releasable and said cutter blade is adapted to be variably secured to said cutter blade support in at least first and second positions, whereby at least a further portion of the extended cutting edge of the blade may be brought into an operative cutting relationship with respect to the extrudate.

4. The apparatus as claimed in claim 3, wherein said securing means comprises at least first and second screws, said cutter support includes first and second openings therethrough, and said cutter blade includes at least first and second sets of first and second openings, both of said sets of openings being alignable with said first and second openings of said cutter support disc to permit the cutter blade to be mounted in either of said first and second positions with respect to said cutter support.

5. The apparatus as claimed in claim 1, wherein said cutter blade is of a substantially circular configuration and said substantially circular blade is rotatively mounted at a point offset with respect to the center thereof, said point being disposed adjacent the edge of said blade.

* * * * *